(12) United States Patent
Schneider et al.

(10) Patent No.: US 8,166,158 B2
(45) Date of Patent: Apr. 24, 2012

(54) VALIDATING SERVICE COMPONENTS THROUGH DATA MINING

(75) Inventors: James P. Schneider, Raleigh, NC (US); Ronald P. Wen, Cary, NC (US)

(73) Assignee: Red Hat, Inc., Raleigh, NC (US)

( * ) Notice: Subject to any disclaimer, the term of this patent is extended or adjusted under 35 U.S.C. 154(b) by 423 days.

(21) Appl. No.: 12/012,684

(22) Filed: Feb. 4, 2008

(65) Prior Publication Data

US 2009/0198760 A1    Aug. 6, 2009

(51) Int. Cl.
*G06F 15/173* (2006.01)

(52) U.S. Cl. .................. 709/224; 709/201; 709/223

(58) Field of Classification Search .................. 709/224, 709/238, 242, 245
See application file for complete search history.

(56) References Cited

U.S. PATENT DOCUMENTS

| | | | |
|---|---|---|---|
| 6,889,160 B2 * | 5/2005 | Sabiers et al. | 702/122 |
| 7,519,614 B2 * | 4/2009 | Glania et al. | 1/1 |
| 7,940,685 B1 * | 5/2011 | Breslau et al. | 370/251 |
| 2006/0080554 A1 * | 4/2006 | McDonald et al. | 713/189 |
| 2008/0034082 A1 * | 2/2008 | McKinney | 709/224 |
| 2008/0059517 A1 * | 3/2008 | Glania et al. | 707/103 X |
| 2008/0155336 A1 * | 6/2008 | Joshi et al. | 714/37 |
| 2009/0113250 A1 * | 4/2009 | Meijer et al. | 714/43 |
| 2009/0125886 A1 * | 5/2009 | Owens et al. | 717/124 |

* cited by examiner

*Primary Examiner* — John Follansbee
*Assistant Examiner* — Dhairya A Patel
(74) *Attorney, Agent, or Firm* — Lowenstein Sandler PC

(57) ABSTRACT

A method and apparatus for validating service components via data mining. In one embodiment, the method includes making service components to be available for use in a production environment of a service subscriber, receiving data produced by instances of the service components in the production environment, and storing the received data in at least one database. The method may further include identifying a service component that is being evaluated, retrieving, from the database, data produced by instances of the service component being evaluated, and providing the retrieved data to a recipient, where the retrieved data indicates effectiveness of the service component being evaluated.

19 Claims, 6 Drawing Sheets

VALIDATING SERVICE COMPONENTS THROUGH DATA MINING

TECHNICAL FIELD

Embodiments of the present invention relate to testing products of service providers, and more specifically to validating service components through data mining.

BACKGROUND

Computer networks have become increasingly complex while people have relied on computers coupled to the networks to transmit and fetch information. The computer networks are responsible for transporting information between the computers used in the business as well as allowing users to connect to their work from remote locations. Network monitoring services have been developed to assist in detecting unexpected changes in the devices on the network. A network monitoring service provider may use a network appliance on the customer network to monitor devices on the customer network and send results to the monitoring service provider. The monitoring service provider then analyzes information received from the network appliance and provides alerts and various reports to an administrator of the customer network.

A network appliance may host various subroutines that perform different functions pertaining to gathering and reporting monitoring data to the service provider. For example, some subroutines may monitor performance of the Microsoft® Windows server, other subroutines may monitor performance of web servers, and yet other subroutines may monitor performance of database servers. Depending on what is included in the customer network, a customer may create multiple instances of various subroutines to monitor different components of the network. These instances are referred to herein as probes. Prior to making the subroutines available to the customer, the service provider may want to evaluate the effectiveness of the subroutines. Typically, such evaluation is performed by setting up the test environment and creating probes for monitoring target systems in the test environment. The monitoring data produced by the probes is then evaluated to ensure that the probes operate as expected. However, this approach involves significant expenses. In particular, this approach requires new hardware and/or software for each new class of probes being evaluated, as well as experienced engineers to maintain the test environment. In addition, the above approach may not always provide accurate results because the test environment is unlikely to be exactly the same as the production environment.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Figure 1:
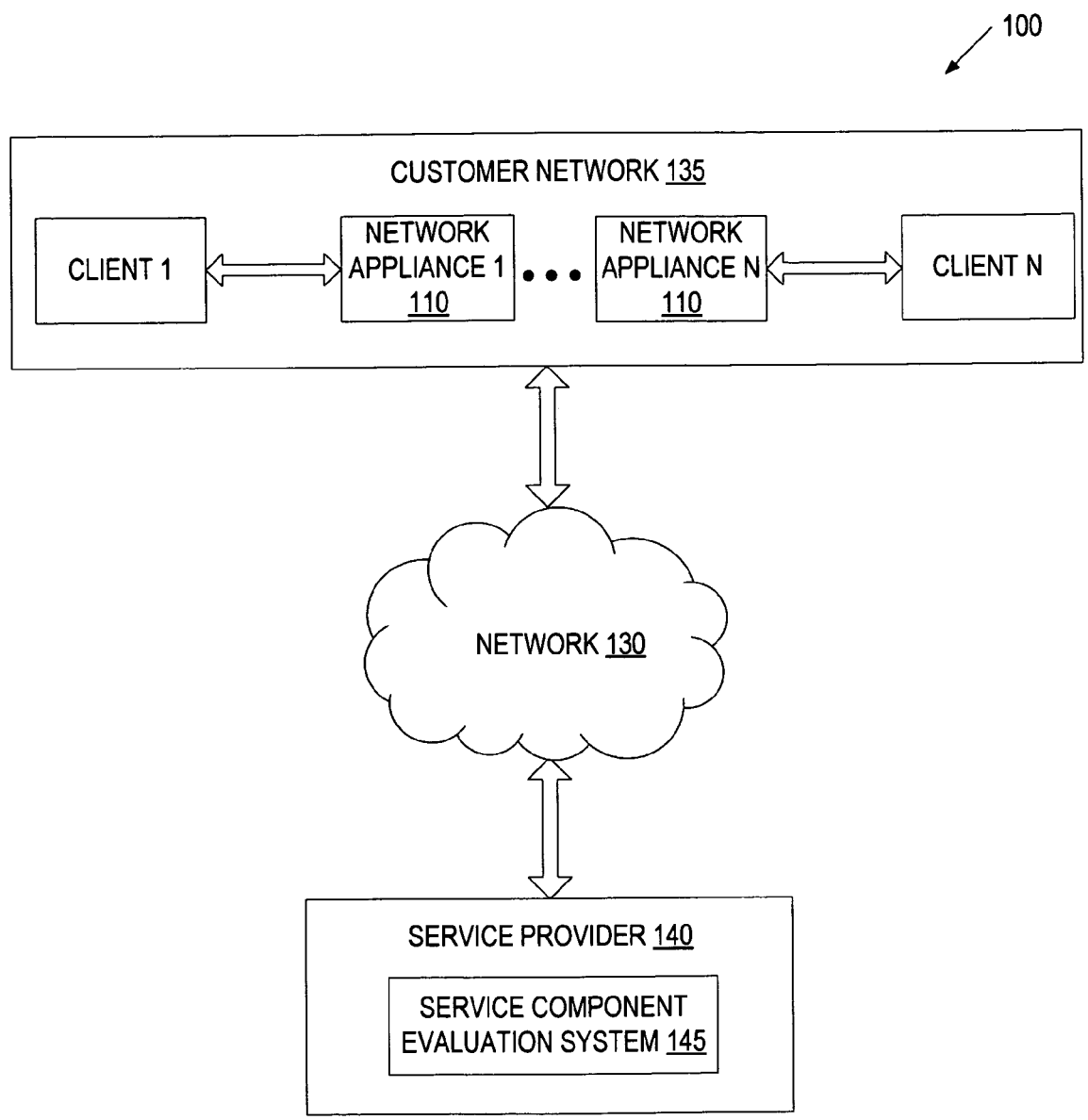
FIG. 1 illustrates an exemplary network architecture in which embodiments of the present invention may operate.

Described herein is a method and system for evaluating effectiveness of service components through data mining. Service components may be, for example, software or firmware constituents of a service offered by a service provider. The service provider can make various service components to be available for use in a production environment of a customer (i.e., a service subscriber). These service components may be released as test versions to check whether they function in the production environment as expected by the service provider. Customers may create various instances of service components to obtain desired functionality. During execution, instances of the service components generate data and send this data to the service provider. The service provider stores this data in a database. Data generated by the instances may be stored with a corresponding service component ID and a corresponding instance ID.

Subsequently, the service provider may identify a service component being evaluated (e.g., upon receiving a service component ID from a requester), and search the database for data produced by the instances of this service component. This data may then be provided to the requester (e.g., an engineer analyzing this service component) who will review it and determine whether the service component operates as expected. In addition, the requester may be provided with the current number of instances of the service component to evaluate popularity of the service component.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include a service provider 140 connected with a customer network 135 (e.g., a local area network (LAN), wide area network (WAN), intranet, etc.) over a public network 130 (e.g., Internet). Alternatively, the customer network 135 may be connected with the service provider 140 via a private network (e.g., an intranet, virtual private network (VPN), etc.).

The customer network 135 may represent a network of an enterprise and may include such devices as desktop computers, laptop computers, network printers, switches, routers, gateways, firewalls, or any other devices having a network address. The customer network 135 may also include one or more network appliances 110. Network appliance 110 may be a device that is configurable over a network to perform a network related function (e.g., network monitoring) upon connection with the customer network 135. The network appliance 110 may be a computing device such as, for example, a desktop computer, laptop computer, server, etc. Optionally, a client device (client) may be coupled with each network appliance 110 for operation by an IT administrator or some other user. The client may be a computing device such as, for example, a desktop computer, laptop computer, server, etc. In one embodiment, the client may be used to allow a user to request activation of network appliance 110 and to provide configuration of the network appliance 110. Alternatively, the network appliance 110 may be activated and/or configured automatically, without any involvement of, and need for, the client.

Service provider 140 provides one or more services to the customer network 135. In one embodiment, the service provider 140 uses the network appliance 110 to collect information about the customer network 135 and devices on the customer network 135. In particular, the network appliance 110 may collect current characteristics of the devices including characteristics of their hardware components, operating systems, databases, network services, applications, websites, etc.

The service provider 140 uses the information provided by the network appliance 110 to generate alerts and various reports for users such as IT administrators. The service provider 140 may include one or more servers that communicate with the network appliance 110 and provide back-end functionality such as generating network status updates, performing transactions, etc. The service provider 140 may generate a user interface to allow users such as IT administrators to view reports and other information about the customer network 135 (e.g., via the client).

In one embodiment, the service provider 140 provides functionality offered by the service by downloading various subroutines to the network appliance 110 and allowing the customer to create instances of subroutines designated to perform functionality desired by the customer. For example, some subroutines may be designated to monitor performance of the Microsoft® Windows server, other subroutines may be designated to monitor performance of web servers, and yet other subroutines may be designated to monitor performance of database servers. Depending on what is included in the customer network, the customer may create multiple instances of various subroutines to monitor different components of the network.

In one embodiment, the service provider 140 hosts a service component evaluation system 145 that evaluates the effectiveness of the subroutines. In particular, the service component evaluation system 145 downloads test versions of subroutines being evaluated to the network appliance 110 operating in the production environment and allows the IT administrator or some other users to create instances of these subroutines as needed. These instances are referred to herein as probes. When probes are executed to perform their monitoring functions, they generate monitoring data and send the monitoring data to the service component evaluation system 145, which stores it in a designated database. Subsequently, the service component evaluation system 145 can search the database for data produced by all probes of the subroutine being evaluated. This data may then be provided to an engineer or some other recipient analyzing these probes who will review the data and determine whether the probes operate as expected. In addition, the recipient may be provided with the current number of probes created from the specific subroutine to evaluate its popularity.

It should be noted that the architecture 100 is provided for illustrative purposes only and should not to limit embodiments of the present invention to a customer network 135 having one or more network appliances 110. Another exemplary architecture in which embodiments of the present invention can operate may include a service provided by a service provider to perform specific functionality for one or more customers. The functionality provided by the service may include, for example, network monitoring, job execution scheduling, user login verification, etc. A service component evaluation system hosted by the service provider may be responsible for validating service components (e.g., software or firmware constituents of the service) in the production environment of the customer, as will be discussed in more detail below.

Figure 2:
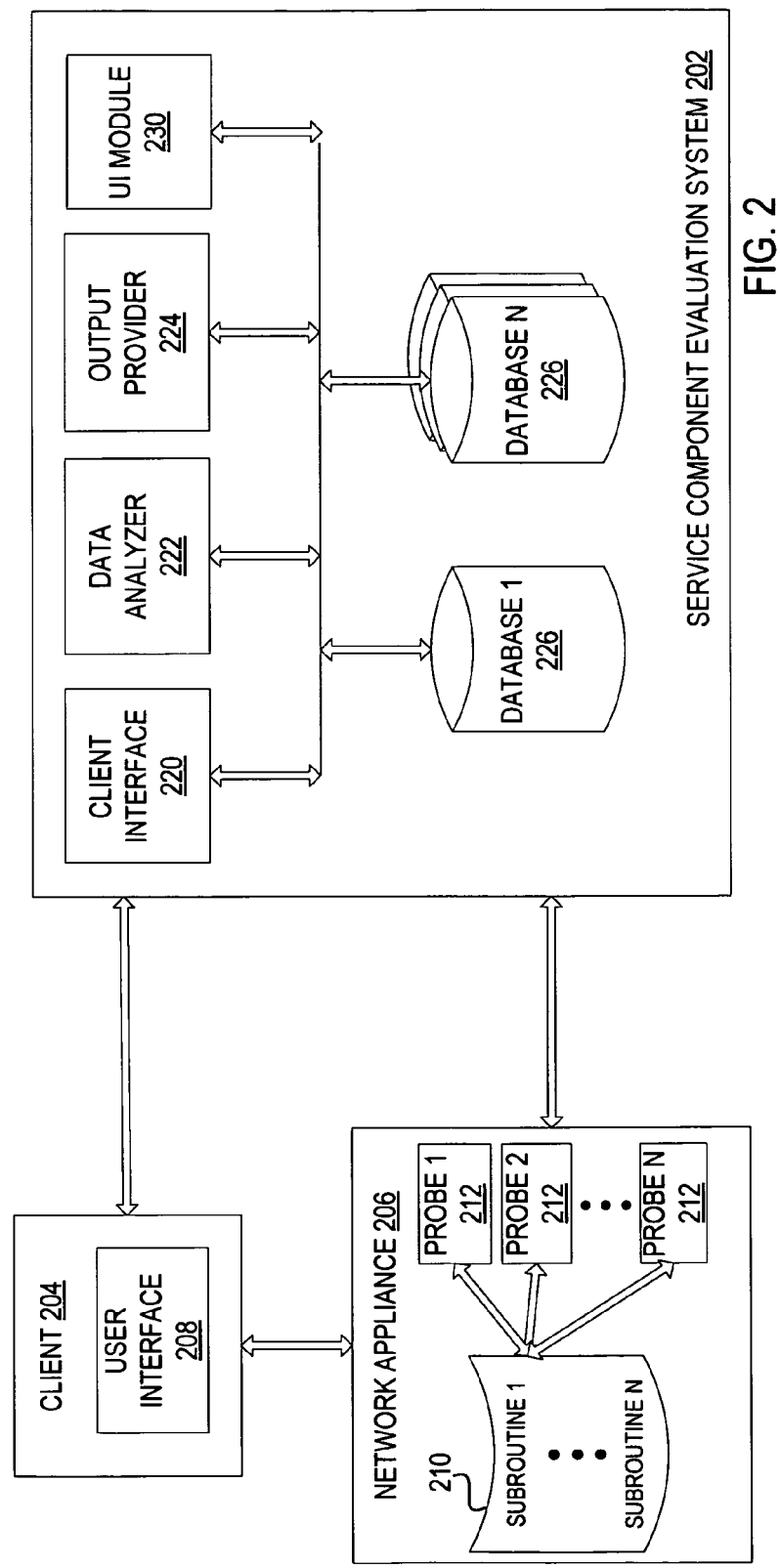
FIG. 2 is a block diagram of one embodiment of a service component evaluation system.

FIG. 2 is a block diagram illustrating the operation of a service component evaluation system 202, according to one embodiment of the invention. The service component evaluation system 202 may include a client interface 220, a data analyzer 22, an output provider 224, a user interface (UI) module 230, and databases 226 and 228.

The client interface 220 downloads subroutines 210 to a network appliance 206 (e.g., to a designated library on the network appliance 206). Periodically new subroutines can be downloaded to the network appliance 206 to provide additional functionality or modify existing functionality. Some subroutines may be downloaded as test versions to check how they operate in the production environment. An IT administrator or some other user may view a list of subroutines 210 via a user interface 208 generated by the UI module 230 and presented on client 204. Depending on the needs of the customer, the IT administrator may create various probes from the subroutines on the list 210. Among other probes, the IT administrator may, for example, create probes 212 of a test subroutine 1. Each probe may have a probe ID and be associated with an ID of a corresponding subroutine.

When probes are executed, they perform designated functionality such as monitoring various devices and generating monitoring data. The monitoring data is sent to the service component evaluation system 202 that stores the monitoring data in a database. In one embodiment, the service component evaluation system 202 includes several databases. The first database 226 stores information on current subroutines hosted by various network appliances in one or more customer networks. In particular, the database 226 stores IDs of current subroutines and IDs of probes created from these subroutines. Databases 228 store monitoring data produced by the probes. Each database 228 may store monitoring data produced by specific probes. For example, one database may store monitoring produced by probes 1 through 100, another database may store monitoring data produced by probes 101 through 200, etc.

When new probes are created, the network appliance 206 sends information on the new probes to the service component evaluation system 202. The data analyzer 222 adds IDs of the new probes to the database 226, in association with IDs of corresponding subroutines. When probes generate monitoring data, the data analyzer 222 receives the monitoring data and distributes it to an appropriate database 228.

As discussed above, some of these probes may be created from subroutines that are being tested. The data analyzer 222 may identify such subroutines (e.g., upon receiving a request with a subroutine ID), and retrieve monitoring data generated by the probes of the subroutine being evaluated from the database(s) 228. In one embodiment, the data analyzer 222 first retrieves probe IDs matching the subroutine of interest from the database 226. Based on the probe IDs, the data analyzer determines which databases store monitoring data generated by these probes, and retrieves monitoring data from these databases.

The output provider 224 presents this information to a recipient (e.g., via a report, email, etc.). In one embodiment, the output provider 224 adds additional information that may be helpful for evaluation, e.g., the number of probes created from the subroutine of interest, corresponding probe IDs, subroutine ID, customer identifier, etc. The recipient may analyze this information to determine, for example, whether the probes operate as expected (e.g., returned data is reasonable), whether the subroutine is popular (based on the number of created probes over a time interval), etc.

In one embodiment, the client interface 220 may download to the network appliance 210 one or more subroutines that can be used for evaluation purposes only. That is, in one embodiment, these subroutines may be marked as "hidden" and may not be included in the list of probes displayed in the user interface 208. As a result, IT administrators or other end users will not be able to create probes from these subroutines. Instead, such probes may be created by engineers who perform testing. These probes will also be marked as hidden and will not be included in the view of the customer network presented in the UI 208. The monitoring data created by these probes will not be presented to the customer either. That is, the UI module 230 will exclude hidden subroutines, hidden probes and monitoring data generated by the hidden probes from any content presented in the UI 208. In one embodiment, the UI 208 presents a notification indicating that some probes have been created for testing purposes only, and that these probes, although invisible to end users, might have an impact on current characteristics of the customer network.

Figure 3:
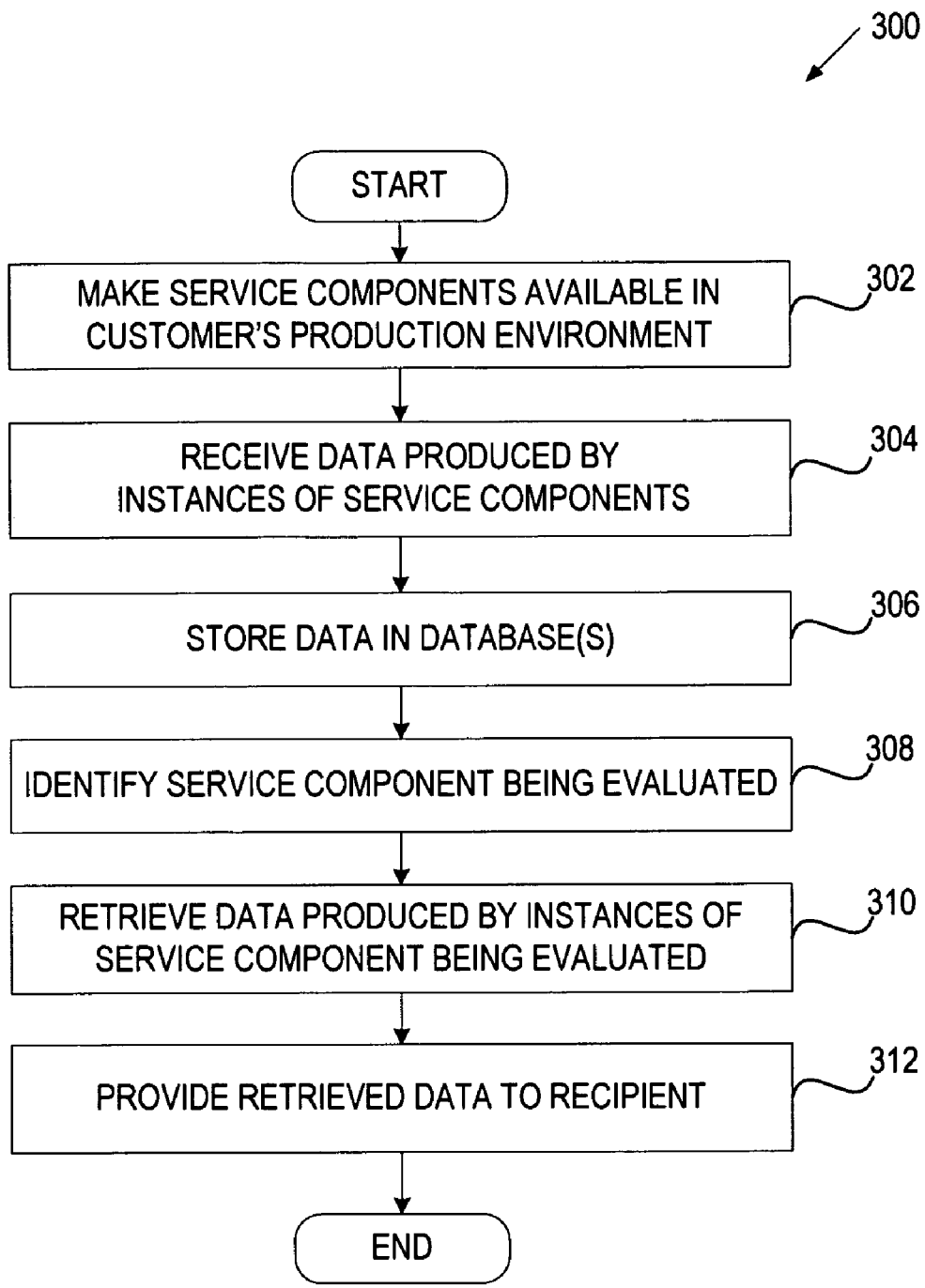
FIG. 3 is a flow diagram of a method for evaluating effectiveness of service components.

FIG. 3 is a flow diagram illustrating one embodiment of a method 300 for evaluating effectiveness of service components. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 300 is performed by a service provider, such as service provider 140 of FIG. 1.

Referring to FIG. 3, method 300 begins with processing logic making service components available in the customer production environment. Service components may be software or firmware constituents of a service provided by the service provider. The service components can be made available by, for example, downloading their test versions to a network appliance or some other device in the customer network.

At block 304, processing logic receives data produced by instances of the service components. This data may be produced when service component instances are executed to perform the designated functionality. For example, this data may be produced by the service component instance as a result of network monitoring, job execution scheduling, user login verification, etc.

At block 306, processing logic stores the received data in one or more databases. In one embodiment, the received data is stored with corresponding instance IDs and service component IDs.

At block 308, processing logic identifies a service component being evaluated. Processing logic may identify such a service component upon receiving a request specifying a service component ID. The request may be specified by an engineer or some other requester performing the evaluation.

At block 310, processing logic retrieves data produced by instances of the service component being evaluated from one or more databases storing this data. In one embodiment, processing logic retrieves only data that satisfies some specific parameters that may, for example, indicate unexpected performance of the service component instances. The parameters may be hard-coded or specified by the requester.

At block 312, the retrieved data is provided to the requester. In one embodiment, the retrieved data may be accompanied by some additional information (e.g., service component ID, instance IDs, number of instances created from the service component, customer ID, etc.).

Figure 4:
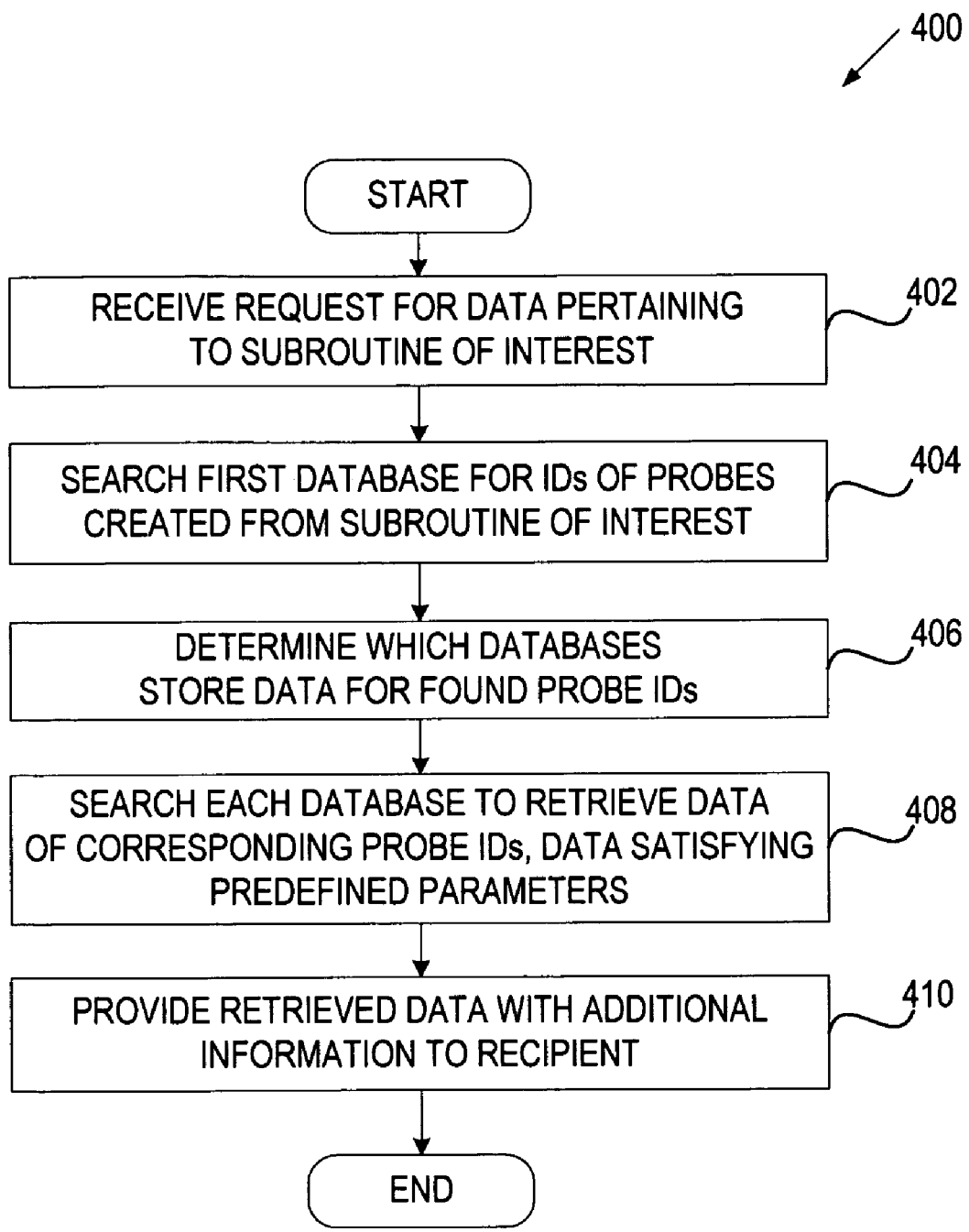
FIG. 4 is a flow diagram of a method for providing data indicative of probe effectiveness.

FIG. 4 is a flow diagram of a method for providing data indicative of probe effectiveness. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 400 is performed by a service provider, such as service provider 140 of FIG. 1.

Referring to FIG. 4, processing logic begins with receiving a request for data pertaining to a subroutine of interest (block 402). At block 404, processing logic searches a first database for IDs of probes created from the subroutine of interest. At block 406, processing logic determines which databases store data associated with probe IDs found at block 404. At block 408, processing logic searches each database to retrieve data associated with the above probe IDs. In addition, the retrieved data may also satisfy some parameters (predefined or specified in the request). At block 410, processing logic provides the retrieved data to the requester (e.g., in a report, email, etc.). The retrieved data may be provided with some additional information such as subroutine ID, probe IDs, number of probes created from the subroutine, customer ID, etc.

Figure 5:
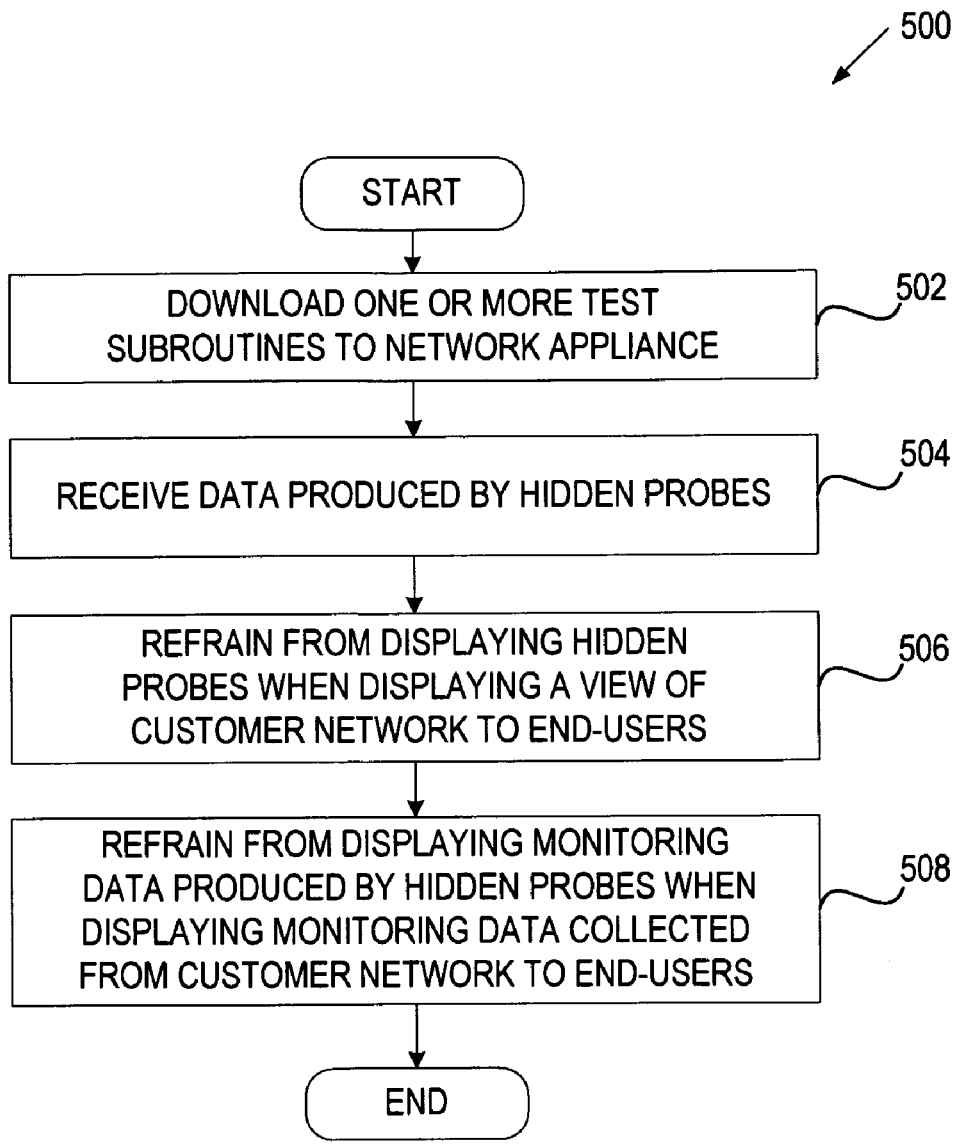
FIG. 5 is a flow diagram of a method for utilizing hidden probes to evaluate their effectiveness.

FIG. 5 is a flow diagram of a method for utilizing hidden probes to evaluate their effectiveness. The method may be performed by processing logic that may comprise hardware (e.g., circuitry, dedicated logic, programmable logic, microcode, etc.), software (e.g., instructions run on a processing device to perform hardware simulation), or a combination thereof. In one embodiment, method 500 is performed by a service provider, such as service provider 140 of FIG. 1.

Referring to FIG. 5, processing logic begins with downloading one or more test subroutines to a network appliance operating in the production environment (block 502). Test subroutines can be marked as hidden to be invisible to end-users. In addition, probes created from these subroutine can also be marked as hidden. At block 504, processing logic receives monitoring data produced by hidden probes and stores this data in a database with a hidden indicator.

At block 506, processing logic receives a request to present a view of the customer network from an IT administrator or another end-user, and generates the view of the customer network that excludes the probes marked as hidden. The view may be displayed to the end-user in a UI provided on the client device.

At block 508, processing logic generates a report including monitoring data collected from the customer network for the IT administrator, without including monitoring data produced by the hidden probes. The report may displayed to the IT administrator in a UI provided on the client device.

Figure 6:
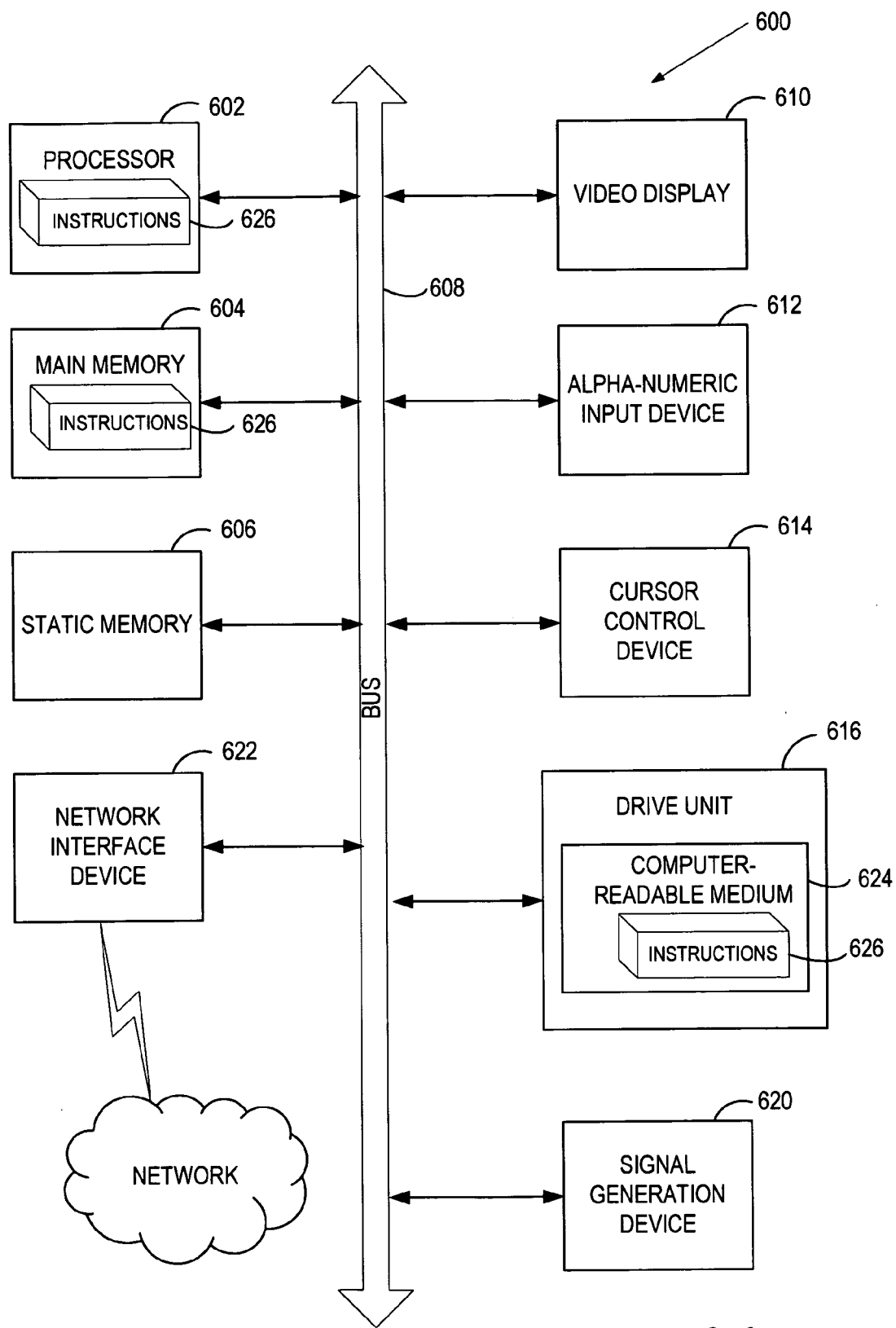
FIG. 6 illustrates a diagrammatic representation of a machine in the exemplary form of a computer system, in accordance with one embodiment of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer implemented method for a provider of a service, the method comprising:

making a plurality of service components to be available for use in a production environment of a service subscriber by deploying the plurality of service components designated to operate in the production environment of the service subscriber;

causing instances of the plurality of service components to be created in the production environment;

receiving production data produced by the instances of the plurality of service components in the production environment, at least one of the instances of the plurality of service components operating in the production environment invisibly to service subscriber end users;

storing the production data produced by the instances of the plurality of service components in at least one database;

identifying one of the plurality of service components that is being evaluated;

retrieving, from the database, production data produced by instances of the service component being evaluated;

providing the production data produced by instances of the service component being evaluated to a service provider user, the production data indicating effectiveness of the service component being evaluated in the production environment;

determining a number of instances that have been created for the service component being evaluated; and indicating a popularity of the service component being evaluated based on the determined number of instances of the service component.

2. The method of claim 1 further comprising:

providing a user interface allowing service provider users to create service component instances.

3. The method of claim 1 wherein each of the plurality of service components is a subroutine for providing desired functionality.

4. The method of claim 1 wherein:

each of the plurality of service components has a service component identifier (ID) and each service component instance has an instance ID; and storing the production data produced by instances of the plurality of service components data in at least one database comprises storing each instance ID with a corresponding service component ID in a first database, and storing data produced by a service component instance in a second database with a corresponding instance ID.

5. The method of claim 4 wherein retrieving, from the database, production data produced by instances of the service component being evaluated comprises:

using a service component ID of the service component being evaluated to find corresponding instance IDs in the first database.

6. The method of claim 1 wherein:

the production environment comprises a network of the service subscriber;

the plurality of service components provide functionality pertaining to monitoring the network of the service subscriber; and the network of the service subscriber comprises a network appliance hosting the plurality of service components.

7. The method of claim 6 wherein each service component instance is created in response to an end-user request submitted to the network appliance via a user interface.

8. The method of claim 1 further comprising:

providing at least one additional service component for testing purposes;

causing each instance of the additional service component to be marked as hidden; and refraining from displaying instances of the additional service components to end-users.

9. A non-transitory computer-readable storage medium including instructions that, when executed by a first machine, cause the first machine to perform a method comprising:

making a plurality of service components to be available for use in a production environment of a service subscriber by deploying the plurality of service components designated to operate in the production environment of the service subscriber;

causing instances of the plurality of service components to be created in the production environment;

receiving production data produced by the instances of the plurality of service components in the production environment, at least one of the instances of the plurality of service components operating in the production environment invisibly to service subscriber end users;

storing the production data produced by the instances of the plurality of service components in at least one database;

identifying one of the plurality of service components that is being evaluated;

retrieving, from the database, production data produced by instances of the service component being evaluated;

providing the production data produced by instances of the service component being evaluated to a service provider user, the production data indicating effectiveness of the service component being evaluated in the production environment;

determining a number of instances created for the service component being evaluated; and indicating a popularity of the service component being evaluated based on the determined number of instances of the service component.

10. The non-transitory computer-readable storage medium of claim 9 wherein the method further comprises:

providing a user interface allowing service provider users to create service component instances.

11. The non-transitory computer-readable storage medium of claim 9 wherein:

each of the plurality of service components is a subroutine for providing desired functionality;

each of the plurality of service components has a service component identifier (ID) and each service component instance has an instance ID; and storing the production data produced by instances of the plurality of service components data in at least one database comprises storing each instance ID with a corresponding service component ID in a first database, and storing data produced by a service component instance in a second database with a corresponding instance ID.

12. The non-transitory computer-readable storage medium of claim 9 wherein:

the production environment comprises a network of the service subscriber;

the plurality of service components provide functionality pertaining to monitoring the network of the service subscriber;

the network of the service subscriber comprises a network appliance hosting the plurality of service components; and each service component instance is created in response to an end-user request submitted to the network appliance via a user interface.

13. The non-transitory computer-readable storage medium of claim 9 wherein the method further comprises:

providing at least one additional service component for testing purposes;

causing each instance of the additional service component to be marked as hidden; and refraining from displaying instances of the additional service components to end-users.

14. An apparatus, comprising:

a memory to store instructions for a service component evaluation system; and a processor, connected to the memory, to execute the instructions, wherein the instructions cause the processor to:

make a plurality of service components to be available for use in a production environment of a service subscriber by deploying the plurality of service components designated to operate in the production environment of the service provider;

cause instances of the plurality of service components to be created in the production environment;

receive production data produced by the instances of the plurality of service components in the production environment, at least one of the instances of the plurality of service components operating in the production environment invisibly to service subscriber end users;

store the production data produced by the instances of the plurality of service components in at least one database;

identify one of the plurality of service components that is being evaluated;

retrieve, from the database, production data produced by instances of the service component being evaluated;

provide the production data produced by instances of the service component being evaluated to a service provider user, the production data indicating effectiveness of the service component being evaluated in the production environment;

determine a number of instances created for the service component being evaluated; and indicate a popularity of the service component being evaluated based on the determined number of instances of the service component.

15. The apparatus of claim 14 wherein the processor is further to provide a user interface allowing service provider users to create service component instances.

16. The apparatus of claim 15 wherein:
the processor is further to provide at least one additional service component for testing purposes; and
the processor is further to cause each instance of the additional service component to be marked as hidden, and to refrain from displaying instances of the additional service components to end-users.

17. The apparatus of claim 14 wherein:
each of the plurality of service components is a subroutine for providing desired functionality;
each of the plurality of service components has a service component identifier (ID) and each service component instance has an instance ID; and
the at least one database comprises a first database to store each instance ID with a corresponding service component ID, and a second database to store production data produced by a service component instance with a corresponding instance ID.

18. The apparatus of claim 14 wherein:
the production environment comprises a network of the service subscriber;
the plurality of service components provide functionality pertaining to monitoring the network of the service subscriber;
the network of the service subscriber comprises a network appliance hosting the plurality of service components; and
each service component instance is created in response to an end-user request submitted to the network appliance via a user interface.

19. The apparatus of claim 14 wherein:
the processor is further to determine a number of instances created for the service component being evaluated; and
the processor is further to present the number of instances of the service component being evaluated to the recipient, the number of instances indicating popularity of the service component being evaluated.

* * * * *